(12) United States Patent
Ushio et al.

(10) Patent No.: US 6,587,294 B1
(45) Date of Patent: Jul. 1, 2003

(54) METHOD AND APPARATUS FOR ERROR CORRECTION OF STORED DATA

(75) Inventors: Teruhiko Ushio, Moriyama (JP); Toshio Kanai, Moriyama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,011

(22) Filed: Oct. 5, 1999

(30) Foreign Application Priority Data

Oct. 5, 1998 (JP) .......................................... 10-282233

(51) Int. Cl.[7] ............................................... G11B 5/09
(52) U.S. Cl. ........................... 360/53; 360/51; 714/704; 714/746
(58) Field of Search ..................... 360/53, 51; 714/704, 714/746

(56) References Cited

U.S. PATENT DOCUMENTS 4,532,559 A * 7/1985 Long et al. ................... 360/51
5,172,381 A * 12/1992 Karp et al. .................. 714/775
5,276,666 A * 1/1994 Gunther et al. ............... 369/59
5,760,982 A * 6/1998 Stein ........................... 360/31

FOREIGN PATENT DOCUMENTS

JP      2000113606 A * 4/2000 ........... G11B/20/18

* cited by examiner

*Primary Examiner*—David Hudspeth
*Assistant Examiner*—Dan I. Davidson
(74) *Attorney, Agent, or Firm*—G Marlin Knight; William D. Gill; Ron Feece

(57) ABSTRACT

Method and apparatus to correct an error of read-out data from a data storage medium, particularly a bit shift error, is described. The correction apparatus includes a gray bit detection circuit which flags bits with a phase shift exceeding a threshold and determines whether the previous or next bit cell has a smaller phase error. An RLL error detection circuit and a table containing valid bit combinations may be used in combination with the gray bit detector to correct errors on-the-fly without degrading performance. An advantage of the invention is that it allows correction of errors without regard to conventional ECC and its maximum number of errors.

11 Claims, 2 Drawing Sheets

METHOD AND APPARATUS FOR ERROR CORRECTION OF STORED DATA

BACKGROUND OF THE INVENTION

1. Field of the Invention

The present invention relates to a method and an apparatus for correcting errors of read-out data read out from a medium in which data is stored.

2. Description of Related Art

As storage medium for storing information such as documents, images and sound, there have been storage media (media) such as magnetic disks (typically hard disks HD), digital video disks (DVD), magneto-optic disks (MO), compact disks (CD) and laser disks (LD). When data is reproduced from the media such as DVDs and CDs, errors occur in read-out data owing to changes of reflectance of light, interference between waves, noises and the like. Among the errors, the probability of occurrence of bit shift of one bit is the highest.

FIG. 1 is a block diagram showing a flow of a conventional device for reproducing the read-out data which is read out from conventional media. A readout signal from media 1 is recovered by a read channel 2, and converted to readout data composed of a bit string. The read-out data after the conversion is sent to a mark detector 3. The mark detector 3 detects "SYNC" and a data area in the read-out data. The detected data is decoded in a decoder 4 which includes conversion table 5.

This conventional decoder 4 does not detect whether or not the read-out data (bit string) violates a run length limited (RLL) rule. Furthermore, the decoder 4 does not perform corrections of errors in the read-out data. Conventionally ECC (Error Correction Code) corrects errors in the read-out data. In this case, the number of errors correctable depends on the maximum processing capability of the ECC and errors exceeding the limit of the ECC cannot be corrected. Therefore, there can be data errors which are not corrected by the ECC.

SUMMARY OF THE INVENTION

The object of the present invention is to provide a method and an apparatus, which are capable of correcting errors of read-out data from a data storage medium, especially bit shift errors, regardless of whatever additional ECC may exist.

Another object of the present invention is to provide a novel decoding system capable of correcting errors of read-out data while concurrently decoding the read-out data without degrading its performance.

Still another object of the present invention is to provide a storage device capable of enhancing a signal to noise ratio and decreasing a load on the ECC by executing an error correction by a read channel decoder before conventional ECC processing.

The correction apparatus includes a gray bit detection circuit which flags a bit in a bit cell with a phase shift exceeding a threshold and determines whether a phase error between an intersection of the bit cell and the center of a previous bit cell or a phase error between an intersection of the bit cell and the center of a next bit cell is a smaller phase error. An RLL error correction circuit and a table containing valid bit combinations for the read-out data may be used in combination with the gray bit detector to correct errors on-the-fly without degrading performance. An advantage of the invention is that it allows correction of errors without regard to conventional ECC and its maximum number of errors.

DETAILED DESCRIPTION OF THE PREFERRED EMBODIMENT

Figure 1:
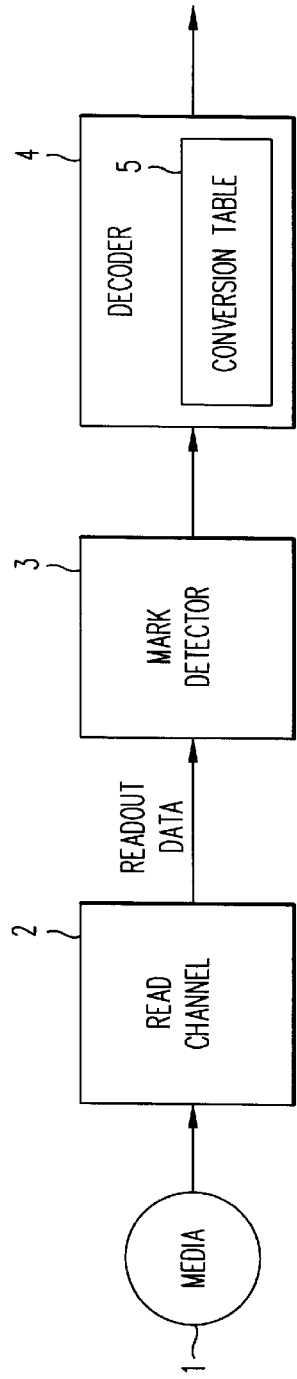
FIG. 1 is a diagram showing a flow chart for a prior art process reproducing read-out data from conventional media.
Figure 2:
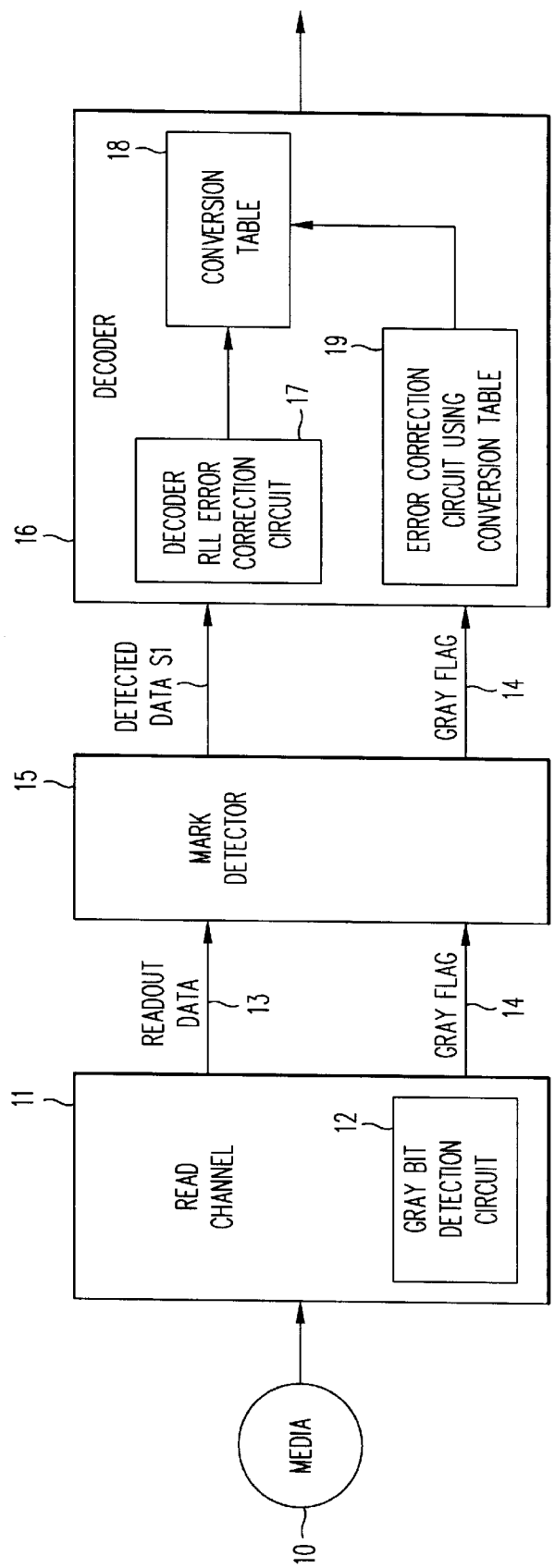
FIG. 2 is a diagram showing an apparatus for correcting a read-out error from a data storage medium according to an embodiment of the present invention.

FIG. 2 is a block diagram showing a flow of a device for correcting errors of read-out data read out from a data storage medium of an embodiment of the present invention. Referring to FIG. 2, the device of FIG. 2 is different from that of the conventional device of FIG. 1 in that a gray bit detection circuit 12 in a read channel 11 is provided and a RLL error correction circuit 17 and an error correction circuit 19 using a conversion table are provided in a decoder 16.

A read signal from media 10 is recovered by a read channel 11 and converted to read data composed of a bit string. In this process, the gray bit detection circuit 12 detects bits (gray bits) in the data bit string by a later described method, which have possible errors. The read-out data 13 in which the gray bits are detected is sent to a mark detector 15. At the same time, gray bit information 14 which sets the logic "1" at the position of the gray bit is sent to the mark detector 15 as a gray flag. For example, when in the data of "0010" there is the possibility of occurrence of position shift of the value "1" between bits two and three, the bit string "0010" is sent to the mark detector 15 as a gray flag.

The mark detector 15 detects "SYNC" and a data area in the read-out data. The data 51 detected by the mark detector 15 is sent to the decoder 16 together with a gray flag sent from the gray bit detection circuit 12. The RLL error correction circuit 17 in the decoder 16 executes the correction of the data violating a run-length limited (RLL) rule based on the gray flag by a later described method. The data error found by the detection circuit 12 is corrected using the conversion table 18. In the conversion table 18, the data, which is transferred thereto after the correction, is decoded. At this time, error correction is also executed by the error correction circuit 19 using the conversion table by a later described method.

So far, the summary of the error correction according to the embodiment of the present invention was described. Since correction according to the present invention is, based on the gray flag, performed for the portion in which the error has been already found, correct data is never changed erroneously, that is, a mis-correction never occurs. Furthermore, since the ECC does not take part in the correction, the number of correctable errors is not limited by the ECC.

Next, the following items will be described in detail below.

(1) A detection of the gray bit by the gray bit detection circuit 12
(2) A detection method and correction of run-length limited violations by the RLL error correction circuit 17
(3) An error correction by the error correction circuit 19 using the conversion table When data is reproduced from a storage medium such as an optical disk on which the data is stored, a read-out signal from the medium must be digitized as a bit string composed of "1"'s and "0"'s. The read-out signal from the storage medium is sampled in a slice circuit and sent to a decision circuit. The decision circuit digitizes the read out signal and allocates it to a bit cell determined using a PLL circuit. The digittted data is sent to a decode circuit according to demand and decoded.

Figure 3:
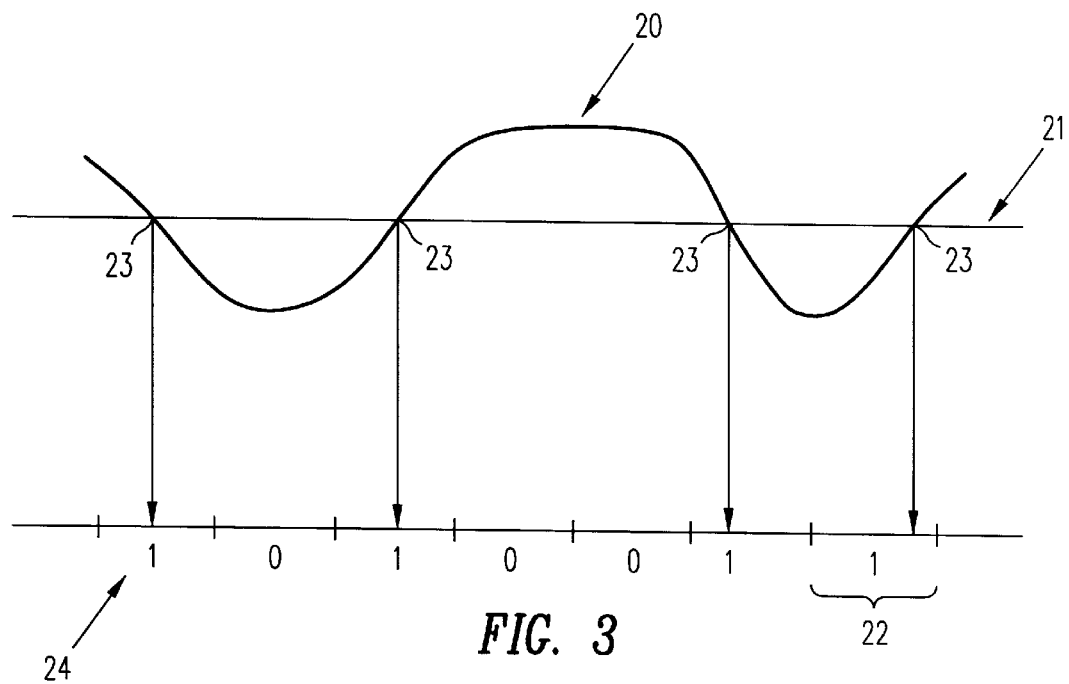
FIG. 3 is a diagram showing a method to digitize a read-out signal produced from a decision circuit.

FIG. 3 is a diagram showing a method for digitizing the read-out signal by the decision circuit. It should be noted that the storage for which the invention can be used includes all sorts of storage media such as digital video disk (DVD), magneto-optic disk (MO), compact disk (CD) and laser disk (LD). Referring to FIG. 3, reference numeral 20 denotes a read-out signal from the media, and reference numeral 21 denotes a slice level signal (slice signal) for digitizing the read-out signal. Reference numeral 22 denotes a bit cell. The bit cell 22 is determined ordinarily by the PLL based on a frequency of the read-out signal from the medium.

FIG. 3, a bit cell including the cross point of the read-out signal 20 and the slice signal level 21 takes the bit "1". A bit cell including no cross point takes the bit "0". Thus, as shown by reference numeral 24 of FIG. 3, the read-out signal 20 is converted to the bit string composed of the bits "1" and "0". A precision of the digitizing of the read-out data in the decision circuit depends on a magnitude of the change (phase error) of the cross points 23 of the readout signal 20 and the slice signal level 21. Specifically, as the phase error becomes larger, the probability of misallocation of the cross point to an erroneous bit becomes higher.

Figure 4:
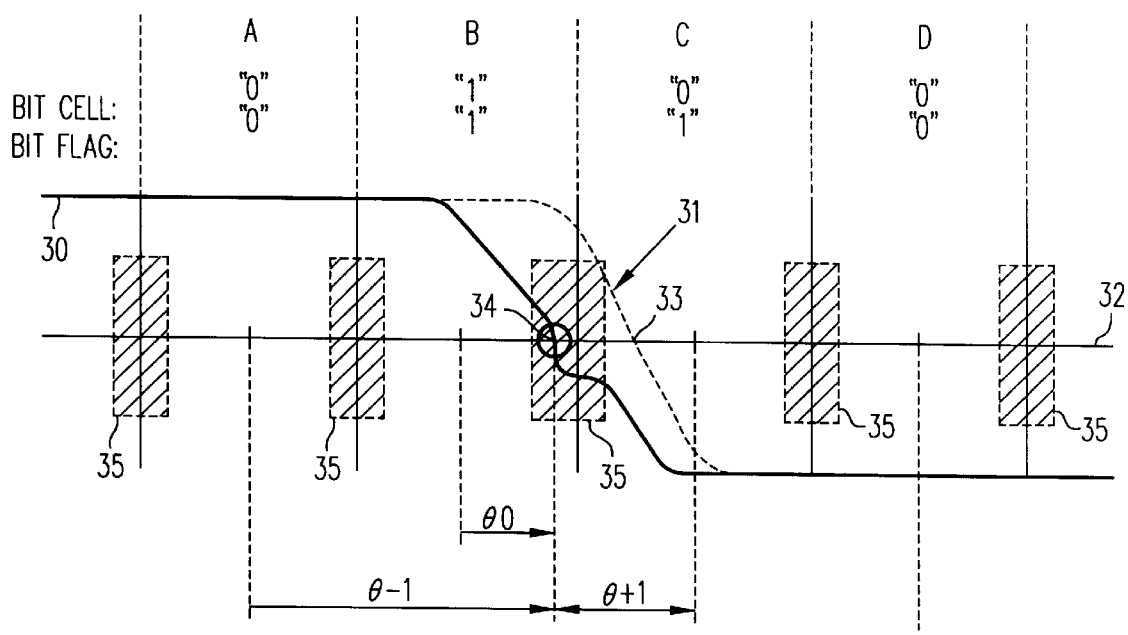
FIG. 4 is a diagram showing an example of a bit string conversion when the read-out signal changes by influences due to noises and characteristic degradation.

FIG. 4 is a diagram showing an example of a bit string conversion when the read-out signal changes due to influences such as noise and character degradation. In FIG. 4, to illustrate these influences the read-out signal 30 is changed into the wave form illustrated by the solid line from the pure original wave form 31 illustrated by the dotted line. The cross point of the read-out signal 30 and the slice signal level 32 shifts from the projected original cross point 33 to the cross point 34. As a result, the bit cell B which is expected to take the bit "0" is allocated to the bit "1".

In the present invention, in order to prevent the occurrence of the situation that the data bit shifts from its original value to other values due to such phase error, the gray bit detection circuit is provided, which detects bits (gray bits) having possible errors. The gray bit detection circuit exhibits the following functions. (a) The gray bit detection circuit detects the phase error of the cross point of the read-out signal and the slice signal level, and sets "the gray nag" in the bit cell having that cross point when the phase error exceeds a specified value. (b) Moreover, when the event of (a) occurs, the gray bit detection circuit detects the phase error (distance) between the cross point and the center of the bit cell before that bit cell and the phase error (distance) between the cross point and the center of the bit cell after that bit cell, and sets "the gray flag" also in the bit cell which exhibits the smaller phase error.

For example, in the example of FIG. 4, when the cross point 34 of the slice signal 32 and the read-out signal 30 which is illustrated by the solid line is included in "the gray zone" 35 illustrated by the oblique lines, the gray bit detection circuit sets the gray flag "1" in the bit cell B. In other words, the evaluation reference value "φ" is compared with the distance "θ0" between the cross point 34 and the center of the bit cell B. When the absolute value of the distance "θ0" is larger than the evaluation reference value "φ" (threshold), the gray bit detection circuit sets the gray bit flag to "1" in the bit cell B. Furthermore, the absolute value of the distance "θ+1" between the cross point 34 and the center of the bit cell C is compared with the absolute value of the distance "θ−1" between the cross point 34 and the center of the bit line A, the gray bit detection circuit sets the gray flag "1" in the bit cell C having the smaller absolute value of the distance "θ+1". In the above described manner, "gray bits", i.e. those bits having possible errors in the bit string, are determined and flagged.

A method for detection and correction of data that violates a run-length limited (RLL) rule using the RLL error correction circuit 17.

The case of RLL (2, 10) will be described as an example below. The same is true of other RLLs (m, n). In accordance with a RLL (2, 10) rule, when the number of bits "0" between bit "1" and bit "1" is not a value ranging from 2 to 10, the detection result is considered to be erroneous, that is, a contravention against the rule.

The following two cases are given as the sorts of the errors.

(a) the number of the bits "0" is not larger than 1

(b) the number of the bits "0" is not smaller than 11

The RLL error correction circuit 17 performs the correction when the RLL (2, 10) rule is contravened.

(a) Correction of the error when the number of the bits "0" is not larger than 1

The following errors are supposed when the correct value is "010010".

Case 1: the bit "1" on the right side shifts to the left by one bit

| DATA | 010100 |
| GRAY FLAG | 000110 |
| RL ERROR | 000100 |

Case 2: the bit "1" on the left side shifts to the right by one bit

| DATA | 001010 |
| GRAY FLAG | 011000 |
| RL ERROR | 000010 |

Case 3: the bit "1" on the right side shifts to the left by one bit and the bit "1" on the left side shifts to the right by one bit

| DATA | 001100 |
| GRAY FLAG | 011100 |
| RL ERROR | 000100 |

In such cases, the RLL error correction circuit 17 performs the following corrections.

(1) When the gray flag (GRAY FLAG) and the run-length error (RL error) detection position coincide with each other, the data bit in the erroneous position is corrected to "01".

(2) When the gray flag (GRAY FLAG) and the run-length error (RL error) detection position do not coincide with each other, a data bit at a position preceding to the disagreement bit is corrected to "01".

(b) Correction when the number of bit "0" is large.

For example, the following errors are supposed when the correction value is "01000000000010".

Case 1: the bit "1" on the right side shifts to the right by one bit

| DATA | 010000000000010 |
|---|---|
| GRAY FLAG | 000000000000110 |
| RL ERROR | 000000000000010 |

Case 2: the bit "1" on the left side shifts to the left by one bit

| DATA | 010000000000010 |
|---|---|
| GRAY FLAG | 011000000000000 |
| RL ERROR | 000000000000010 |

Case 3: the bit "1" on the right side shifts to the right by one bit and the bit "1" on the left side shifts to the left by one bit

| DATA | 0100000000000010 |
|---|---|
| GRAY FLAG | 0110000000000110 |
| RL ERROR | 0000000000000100 |

In such cases, the RLL error correction circuit 17 performs the correction as described below.

When the gray flag (GRAY FLAG) and the run-length error (RL error) detection position coincide with each other, the data bit in the error position is corrected to the bit "10".

When the gray flag (GRAY FLAG) and the run-length error (RL error) detection position do not coincide with each other, a data bit at a position preceding to the disagreement bit is corrected to "01".

(3) Error correction by the error correction circuit 19 using the conversion table.

Data which is corrected according to the RLL rule is decoded by the conversion table 18 in the decoder 16. In the prior art, when the data do not exist in the conversion table, the decoder allows the data to change to suitable data and the ECC performed the correction. On the contrary, in the present invention, when the data is not in the conversion table and the gray flag is 1, the error correction circuit 19 performs the correction by executing the exclusive OR (XOR) with the data and the gray flag as follows.

(data) XOR (GRAY FLAG)

For example, the situation in which the correct data is "010 0001 0000 0000" and the bit "1" on the right side shift to the left by one bit is assumed. In this case,

| DATA | 010 0010 0000 0000 |
|---|---|
| GRAY FLAG | 000 0011 0000 0000 |

This data does not contravene the RLL (2, 10) rule but does not exist in the conversion table. Here, the error correction circuit 19 performs the exclusive OR for the data and the gray flag. Specifically, (010 0010 0000 0000) XOR (000 0011 0000 0000)=010 0001 0000 0000 is established, and the correct value is acquired.

As described above, according to the present invention, the following advantages can be obtained.

(1) Since the error correction is executed using the RLL rule and the conversion table, the errors can be corrected regardless the maximum number of ECC correctable errors. Therefore, the errors can be corrected regardless the number of the errors. Furthermore, the error correction at the 2 bit and 10 bit portions where the probability that the one bit shift will occur under the RLL (2, 10) rule can be performed with a high probability.

(2) Since the error corrections are performed on-the-fly throughout the data transfer and the data decoding, the error correction can be executed without deteriorating the performance.

We claim:

1. A method for correcting errors in a signal read from a data storage medium, comprising the steps of:

converting the signal read from the medium into a first bit string;

determining a phase shift for transitions in the signal;

generating gray flag information indicating each phase shift exceeding a threshold; and if the first bit string is not a valid bit combination, then forming a second string by correcting error bits in the first bit string using the gray flag information and decoding the second bit string to obtain data;

wherein the step of converting the signal further comprises the unordered steps of:

detecting a frequency of the signal;

dividing the signal into bit cells based on the frequency of the signal;

detecting intersections of the signal and a slice signal level; and setting each bit cell not having an intersection to bit "0".

2. The method according to claim 1, further comprising:

selecting a bit cell; and obtaining a phase difference between a center of the selected bit cell and an intersection in the selected bit cell.

3. The method according to claim 2, further comprising the steps of:

obtaining a first phase difference between the center of a previous bit cell before the selected bit cell and the intersection and a second phase difference between the center of the next bit cell after the selected bit cell and the intersection; and setting the gray flag for the selected bit cell and at least one cell from a group consisting of the previous bit cell and the next bit cell using the first and second phase differences.

4. The method according to claim 1, wherein the data storage medium is selected from a group including a magnetic disk (HD), a digital video disk (DVD), a magneto-optic disk (MO), a compact disk (CD) and a laser disk (LD).

5. A data storage device which corrects an error in data read from a data storage medium, comprising:

a read channel which converts a signal read from the medium into a data bit string;

a gray bit detection circuit which detects gray bits in the signal based on a phase shift of transitions in the signal and generates gray flag information according to the phase shift; and a decoder comprising;

a run-length limited (RLL) error correction circuit which generates an RLL flag according to violations of selected run length rules; and a gray bit error correction circuit which corrects an error bit in the data bit string based on the gray flag information and the RLL flag.

6. The device according to claim 5, wherein the gray flag information contains a bit for each bit in the data bit string.

7. A method for correcting errors in a signal read from a data storage medium, comprising the steps of:
- converting the signal read from the medium into a first bit string;
- determining a phase shift for transitions in the signal;
- generating gray flag information indicating each phase shift exceeding a threshold; and
- if the first bit string is not a valid bit combination, then forming a second bit string by correcting at least one error bit in the first bit string and decoding the second bit string to obtain data, the step of correcting the at least one error bit further comprising the non-ordered steps of:
  - generating run-length limited (RLL) flag information indicating violations of a run-length limitation;
  - checking a run-length of the first bit string;
  - detecting the at least one error bit in the first bit string based on the run-length limitation; and
  - correcting the at least one error bit using both the gray flag information and the RLL flag information.

8. A storage device comprising:
- means for detecting a frequency of a signal read from a medium;
- means for determining bit cells based on the frequency of the signal;
- a detector for detecting intersections of the signal and a slice signal level;
- means for setting each bit cell having an intersection to bit "1" and otherwise setting each bit cell not having an intersection to bit "0";
- a gray bit detection circuit which sets a gray flag in a respective bit cell having a phase error (distance) between the intersection of the respective bit cell and a center of the respective bit cell greater than a selected threshold, in which case the gray bit detection circuit compares a first phase error (distance) between the intersection of the respective bit cell and the center of a next bit cell after the respective bit cell and a second phase error (distance) between the intersection of the respective bit cell and the center of a previous bit cell before the respective bit cell, and sets the gray flag in the previous bit cell or the next bit cell depending on which of the first and second phase errors (distances) is smaller; and
- a circuit for correcting an error in the respective bit cell based on the gray flag.

9. The storage device according to claim 8, wherein the circuit for correcting the error further comprises a run-length limited (RLL) detector which generates an RLL flag reflecting a bit position that is erroneous, namely a bit position that violates a selected run-length limited (RLL) rule; and the circuit for correcting the error further comprises means for setting a data bit in the erroneous position to "01" when the gray flag is set in the bit cell having the data bit in the erroneous position and when the gray flag is not set in the bit cell having the data bit in the erroneous position, a data bit preceding the data bit in the erroneous position is corrected to "01".

10. The storage device according to claim 8, wherein the circuit for correcting the error further comprises means for exclusive OR'ing the gray flag in the respective bit cell and a data bit in the respective bit cell when the data bit in the respective bit cell precludes a valid bit combination in the signal read from the medium.

11. The storage device according to claim 8, wherein the circuit for correcting the error further comprises means for exclusive OR'ing the gray flag in the respective bit cell and a data bit in the respective bit cell when the data bit in the respective bit cell precludes a valid bit combination in the signal read from the medium and the data bit in the bit cell is not in an erroneous position.

* * * * *